No. 890,933. PATENTED JUNE 16, 1908.
H. ROWNTREE.
BRAKE MECHANISM.
APPLICATION FILED MAR. 30, 1907.

Witnesses:
Inventor
Harold Rowntree
By his Attorney
Samuel E. Darby

UNITED STATES PATENT OFFICE.

HAROLD ROWNTREE, OF CHICAGO, ILLINOIS.

BRAKE MECHANISM.

No. 890,933.  Specification of Letters Patent.  Patented June 16, 1908.

Application filed March 30, 1907. Serial No. 365,553.

*To all whom it may concern:*

Be it known that I, HAROLD ROWNTREE, a citizen of the United States, residing at Chicago, county of Cook, State of Illinois, have made a certain new and useful Invention in Brake Mechanism, of which the following is a specification.

This invention relates to brake mechanism.

The object of the invention is to provide a brake mechanism which is simple in construction and economical to manufacture, and wherein, when pressure is applied, slack due to the wear of the parts is first taken up and when such pressure attains a predetermined degree, the full braking effort is accomplished.

A further object is to provide a brake mechanism whereby the relative movement of the brake and its actuating devices automatically varies, the variation taking place when a predetermined pressure is applied to the brake shoe.

A further object is to provide a brake which embodies means for applying the pressure through an automatic shifting of leverages.

A further object is to provide a brake mechanism in which the braking effort is applied through an automatically shifting fulcrum, such shifting occurring when a predetermined pressure is applied.

Other objects of the invention will appear more fully hereinafter.

The invention consists substantially in the construction, combination, location, and relative arrangement of parts, all as will be more fully hereinafter set forth, as shown in the accompanying drawings, and finally pointed out in the appended claims.

Figure 1:
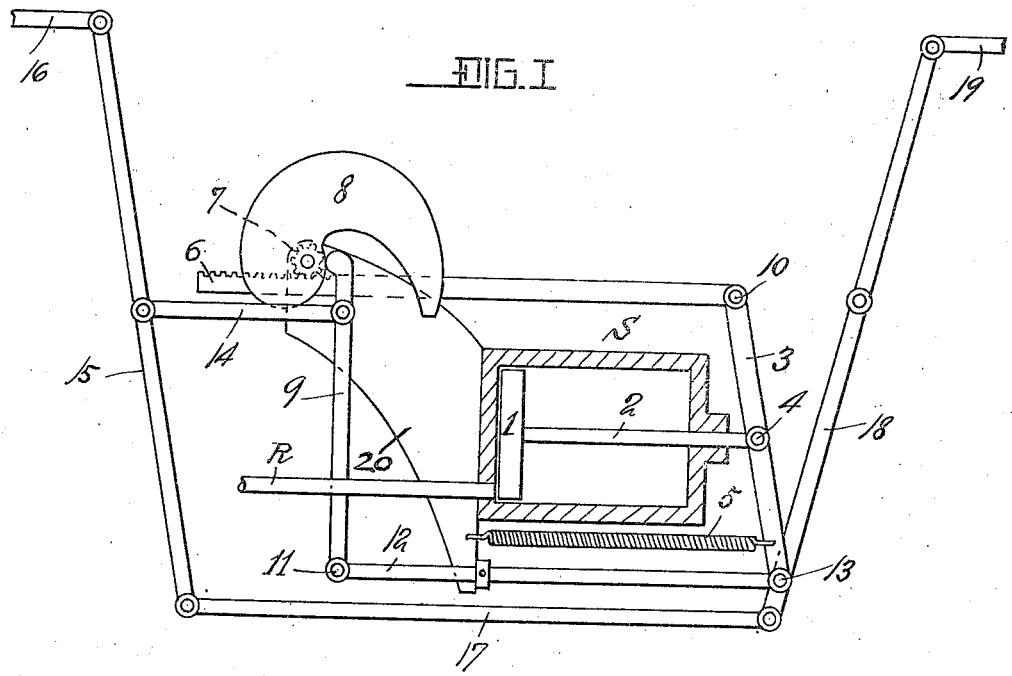
Figure 2:
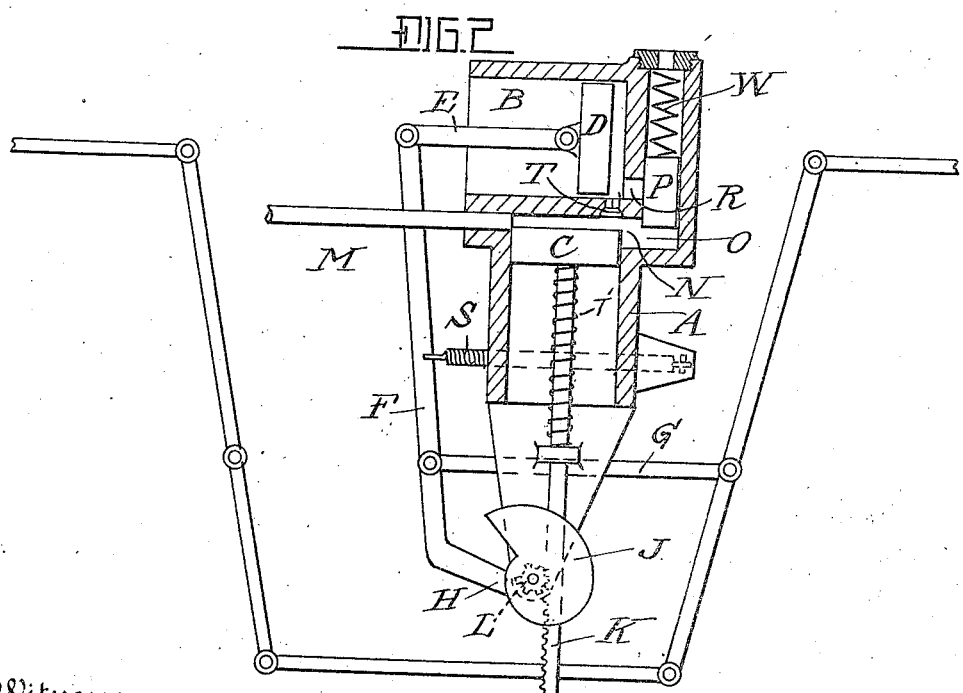

Referring to the accompanying drawings, and to the various views and reference signs appearing thereon, Figure 1 is a view showing one form of air brake mechanism embodying the principles of my invention.
Fig. 2 is a similar view showing a modified construction and arrangement embraced within the spirit and scope of my invention.

Referring particularly to Fig. 1, reference sign S, designates the brake cylinder to which a pressure medium is supplied through pipe R, from any suitable control. To the rod 2, of piston 1, working in said cylinder, is pivotally connected, as at 4, a rocking arm 3, at a point intermediate its ends. To one end of this arm 3, as at 10, is pivotally connected a rack bar 6, arranged to mesh with and rotatively actuate a pinion 7, mounted upon or connected with a cam 8, the cam surface of which is arranged to bear against one end of a lever 9. The other end of said lever 9, is connected at 11, through a rod 12, to the opposite end of arm 3, as at 13. To the same end of arm 3, is connected one end of a stout spring 5, the other end of said spring being connected to a fixed part or bracket 20, or otherwise, as may be desired. At a point adjacent the bearing of its ends against the cam surface 8, the lever 9, is connected through a link 14 with the lever 15, through which the brake rod 16, is operated, said lever 15, being connected by rod 17, to the lever 18, for operating the corresponding and coöperating brake rod 19, of the brake rigging, in the usual or any well known, suitable or convenient manner or arrangement.

The operation of the construction so far described is very simple. When pressure is admitted to the cylinder S, and the piston 1, begins to move therein, the arm 3, will be rocked about the point 13, by reason of the tension of the spring 5, being imposed thereon, and in a direction to shift or move the rack bar 6 towards the right from the position shown in the drawing. In other words the arm 3, becomes a lever of the second order, the point 13, being the fulcrum, the power being applied at point 4, and the work accomplished at the point 10. By the movement thus imparted to the rack bar 6, the pinion 7, and with it the cam 8, is rotated, the cam surface bearing against the end of lever 9, and hence rocking said lever in a direction to cause a brake applying movement of the arms 15 and 18, and the rods 16 and 19. This movement serves to take up any looseness in the parts of the brake rigging and any wear or other irregularity of the brake shoes, and such movement continues until a braking pressure, predetermined by the tension of spring 5, is attained through the short leverage of lever 9, acting on link 14. Thereafter the continued movement of the piston 1, causes the fulcrum of arm 3 to shift from the point 13, to the point 10. In other words the tension of spring 5 is overcome and thereafter the arm 3 rocks about the point 10, as a pivot, and hence, pulling on the long arm of lever 9, its point of bearing contact against the cam surface 8, becoming the fulcrum, a strong braking effort is applied to the brakes. In other words the relative movement of the brake and its actuating mechanism automatically varies, the variation taking place when a predetermined pressure is applied to the brake shoe.

In the modified construction shown in Fig. 2, and which is embraced within the spirit and scope of my invention, I have shown a somewhat different arrangement for accomplishing the same result as above pointed out. In this construction I employ two cylinders A, and B, having the pistons C, and D, respectively. The piston C, in cylinder A, operates a rack bar K, which meshes with a pinion L, attached to the hub of a cam J, upon the cam surface of which bears one end H, of a lever F, the other end of said lever being connected by a link E, to the piston D in cylinder B. A strong spring S¹, is connected at one end to the arm or lever F; and at the other end to a fixed bracket or support. An arm or rod G, is also connected to the lever F, and through which the brake shoes are operated in the usual or any ordinary, convenient or suitable manner. A spring T¹, is also arranged to oppose the movement of the piston C, in cylinder A. The pressure medium is admitted to cylinder A, behind piston C, through port M, from any suitable or convenient source and under the usual or any desired system of control. As the piston C, begins to move out under the impelling force of the pressure it causes the rack bar K to rotate pinion L, and with it the cam J, and hence causing lever F, to be rocked about its point of pivotal connection to link E, as a fulcrum. The rod G, is connected to the lever F, at a point closely adjacent the cam contact-end H, thereof, and hence the actuation of said rod G when the cam is revolved, is through a comparatively short leverage. This is sufficient however to cause any looseness in the brake rigging or any wear in the brake shoes to be taken up and the brakes to be applied lightly. When piston C has moved outwardly by the air pressure behind it, the pressure at the same time enters a port N, and a chamber O, in which operates a plunger valve P, against a spring W, and which valve controls a port R, through which the pressure medium is admitted to cylinder B, behind the piston D, therein. This does not take place, however, until a pressure is imposed upon the brakes which is predetermined by the spring W, which, if desired may be made adjustable. When this predetermined pressure occurs, however, the pressure is admitted to cylinder B, and the piston D begins its movement. Thereupon the fulcrum of lever F, is shifted to the end H, thereof which bears upon the cam J. Thereafter the lever F, is rocked about such fulcrum by the movement of the piston D; and, operating through the increased leverage, effects a powerful application of the braking pressure to the brakes. To insure the full release of the brakes in this form of construction, I employ the check valve T, which allows the pressure in cylinder B, free access into cylinder A, and so to the exhaust, after the pressure has been sufficiently reduced to cause the plunger valve P, to close the port R.

A brake mechanism embodying the principles of my invention as above set forth, is equally well adapted for the operation by other means and other ways than air pressure, as it is obvious that the piston rod 2, for instance, in Fig. 1, when moved by whatever means accomplishes a quick taking up of the slack and then a powerful application of the brakes. My invention, therefore, is not to be limited in its broadest scope to the air brake mechanism.

From this description it will be readily seen that in both forms of construction shown and described the relative movement of the brake and its actuating mechanism automatically varies, the variation taking place when a predetermined pressure is applied to the brake shoe. It will also be seen that the variation is accomplished by a shifting of leverage, such shifting being accomplished automatically, and when a predetermined pressure is applied to the brakes. It will also be seen that in the operation of the brake mechanism, the slack is first taken up, the operation of taking up the slack continuing until a certain predetermined pressure is applied to the brake when the leverage is changed to one having a very much greater power, thereby permitting the use of a much smaller cylinder and requiring much less consumption of air without diminishing the braking effort. And I regard this as a most important and valuable feature of my invention. It will also be seen that a brake mechanism embodying the principles of my invention is automatically self adjusting to compensate for wear on the brake shoes or for any slackness or looseness that might exist in the brake rigging. It will also be seen that when the operating cylinder is opened to exhaust, the spring which releases the brakes serves to hold the long leverage connection rigid and in such relation as to enable the cam to operate on the short leverage connections at the next application of the brakes; and that when the cam is placed in operation, such operation continues until the brake pressure created or applied by its operation equals the power or tension of the spring, and when that point is reached the long leverage connection is automatically brought into play to perform its work of making the final application of brake pressure.

It is obvious that many variations and changes in the details of construction and arrangement would readily suggest themselves to persons skilled in the art and still fall within the spirit and scope of my invention, I do not desire therefore, to be limited or restricted to the exact construction, details or arrangements shown and described. But Having now set forth the object and nature of my invention and various constructions embodying the principles thereof, and having described such constructions, their purposes, functions and modes of operation, what I claim as new and useful and of my own invention, and desire to secure by Letters Patent is:—

1. In a brake mechanism, the combination with brake devices and means for applying the same including a pivoted lever, of means for shifting the fulcrum of said lever when a predetermined pressure is applied.

2. In a brake mechanism, the combination with brake devices, and a pivoted lever for operating the same, of automatic means for shifting the fulcrum of said lever when a predetermined brake pressure is applied.

3. In a brake mechanism, the combination with brake devices and means for operating the same including a lever and means for varying the leverage exerted by said lever without varying the point of application of the power thereto, said variation occurring when a predetermined pressure is applied.

4. In a brake mechanism, the combination with brake applying devices and means for operating the same, including a lever, of means for operating said lever through a short arm, to attain a predetermined pressure, and means for shifting the operation to the long arm of the lever when such predetermined pressure is applied.

5. In a brake mechanism, the combination with brake applying devices, and means for operating the same, including a lever, of means for operating said lever through a short arm to attain a predetermined pressure, and means for automatically shifting the operation to the long arm of the lever when such predetermined pressure is attained.

6. In a brake mechanism, the combination with brake applying devices, and means for operating the same, said means including a shifting fulcrum, of means for shifting such fulcrum when a predetermined braking pressure is applied.

7. In a brake mechanism, the combination with brake applying devices, and means for operating the same, including a lever, a cam arranged to operate on the short arm of the lever, means for operating the cam, and means for transferring the operation to the long arm of the lever when the braking pressure attains a predetermined degree.

8. In a brake mechanism, brake applying devices, a lever for operating the same, a cam arranged to operate against the short arm of said lever and means for automatically transferring the application of power to the long arm of the lever when a predetermined pressure is applied through the cam.

9. In an air brake mechanism, brake applying devices, a lever for operating the same, a power cylinder and piston, means connected to said piston for operating said lever through a short arm, and means, whereby when a predetermined pressure is applied to the action of the piston is automatically transferred to the long arm of the lever.

10. In an air brake mechanism, brake applying devices, a lever for operating the same, a power cylinder and piston means connected to said piston for operating said lever through a short arm, and means, whereby when a predetermined pressure is applied through the short arm of said lever said piston operates upon the long arm of said lever.

11. In a brake mechanism, brake applying devices, a lever, a cam against which said lever bears at one end, a rod connected to the other end of said lever and brake applying devices, connections between said lever and brake applying devices, said connections being adjacent the end of said lever which bears against said cam, means for operating said cam, to apply pressure to the brakes, and means, whereby when said pressure attains a predetermined degree said rod is operated to increase the leverage.

12. In an air brake mechanism, brake applying devices, a lever, a cam against which said lever bears at one end, a rod connected to the other end of said lever, connections between said lever and the brake applying devices, said connections being adjacent that end of the lever which bears against the cam, a cylinder and piston, and connections between said piston and cam and rod for operating the same.

13. In an air brake mechanism, brake applying devices, a lever, connections between said lever and brake applying devices, an arm respectively connected at the ends thereof to the ends of said lever, a cylinder and piston, said piston connected to said arm, and a spring connected to said arm.

14. In an air brake mechanism, brake applying devices, an arm, a piston and cylinder, said piston connected to said arm, and connections between the respective ends of said arm and the brake applying devices.

15. In an air brake mechanism, brake applying devices, an arm, a piston and cylinder, said arm pivotally connected intermediate its ends to the stem of said piston, a spring connected to said arm, and connections between the respective ends of said arm and the brake applying devices.

16. In an air brake mechanism, brake applying devices, a piston and cylinder, an arm pivotally connected intermediate its ends and to the stem of said piston, a lever, a rod connecting one end of said lever and one end of said arm, cam engaging the other end of said lever, means actuated by the other end of said arm for moving said cam, connections between said lever and the brake applying devices, and a spring arranged to act upon said arm.

In testimony whereof I have hereunto set my hand in the presence of the subscribing witnesses, on this 28th day of March A. D. 1907.

HAROLD ROWNTREE.

Witnesses:
JOSEPH KLEIN,
S. E. DARBY.